United States Patent [19]

Lingaya

[11] 4,205,243
[45] May 27, 1980

[54] SYNCHRONOUS LINEAR MOTOR

[75] Inventor: Stenio Lingaya, Erlangen, Fed. Rep. of Germany

[73] Assignee: Siemens Aktiengesellschaft, Munich, Fed. Rep. of Germany

[21] Appl. No.: 860,192

[22] Filed: Dec. 13, 1977

[30] Foreign Application Priority Data

Dec. 13, 1976 [DE] Fed. Rep. of Germany ....... 2656389

[51] Int. Cl.² ............................................. I02K 41/02
[52] U.S. Cl. ...................................... 310/13; 104/290
[58] Field of Search .................................. 310/12–19, 310/207, 205, 206, 216; 318/121, 135; 104/148 R, 148 LM, 148 MS

[56] References Cited

U.S. PATENT DOCUMENTS

| | | | |
|---|---|---|---|
| 820,997 | 5/1906 | Steinmetz | 310/207 |
| 3,328,617 | 6/1967 | Preece | 310/216 X |
| 3,456,136 | 7/1969 | Pierro | 318/135 X |
| 3,594,622 | 7/1971 | Inagaki | 310/257 X |
| 3,621,311 | 11/1971 | Von Starck | 310/207 X |
| 3,706,922 | 12/1972 | Inagaki | 310/12 X |
| 4,013,014 | 3/1977 | Holtz | 318/135 X |

*Primary Examiner*—Donovan F. Duggan
*Attorney, Agent, or Firm*—Kenyon & Kenyon

[57] ABSTRACT

A synchronous linear motor having an exciter disposed as a co-moving translator on a track bound vehicle, and having a traveling field winding comprising switching sections which are supplied from a stationary, controlled static frequency changer, wherein the traveling field winding is subdivided into a plurality of individual conductors disposed and connected electrically in parallel so as to reduce the operating reactance. The harmonic content is reduced by an asymmetrical spacing of the individual conductors.

2 Claims, 4 Drawing Figures

SYNCHRONOUS LINEAR MOTOR

BACKGROUND OF THE INVENTION

1. Field of the Invention

This invention relates to a synchronous linear motor in general and more particularly to an improved iron free, long stator motor having a traveling field winding comprising a plurality of individual conductors thereby reducing the operating reactance.

2. Description of the Prior Art

Synchronous linear motors having an excitation winding which is disposed as a co-moveable translator on a track bound vehicle, and including a traveling field winding which is subdivided into switcing sections installed along the line, each section of which is supplied from a stationary, regulated static converter are known, see e.g., U.S. Pat. No. 4,013,014. Synchronous linear motors are being designed as iron free, long stator motors for use in high performance rapid railroads, particularly for the propulsion of electrodynamically or electrostatically guided magnetic suspension railroads.

Due to the great length of its individual switching sections, in the order of several kilometers, the traveling field winding of a long stator motor has a high inductance and therefore, a high operating reactance. The large operating reactance causes a correspondingly large inductive voltage drop across the switching section in question, which must be compensated by a higher supply voltage at the feed point. Therefore, the power factor is reduced.

SUMMARY OF THE INVENTION

An object of the present invention is the design of a traveling field winding for a synchronous linear motor with reduced operating reactance as compared to known traveling field windings.

According to the present invention, the high reactance problem is solved by dividing the current carrying rails of the traveling field winding into several individual conductors which are connected electrically and spatially in parallel.

A traveling field winding designed in accordance with the present invention has a smaller operating reactance than known traveling field windings, which have a single current carrying rail per pole and phase. Thus, either a lower feed voltage can be chosen or, with the same feed voltage, longer switching sections are possible, which in turn require a smaller number of static frequency changers on a given length of line. A further advantage of the traveling field winding according to the present invention is a reduction of the harmonic content of the excitation flux interlinkage. This advantage is realized if an uneven distribution of the spacing of the individual conductors to each other in accordance with a minimum excitation flux interlinkage is chosen. However, it is also possible to choose equal spacings between the individual conductors.

DETAILED DESCRIPTION OF THE INVENTION

Figure 1:
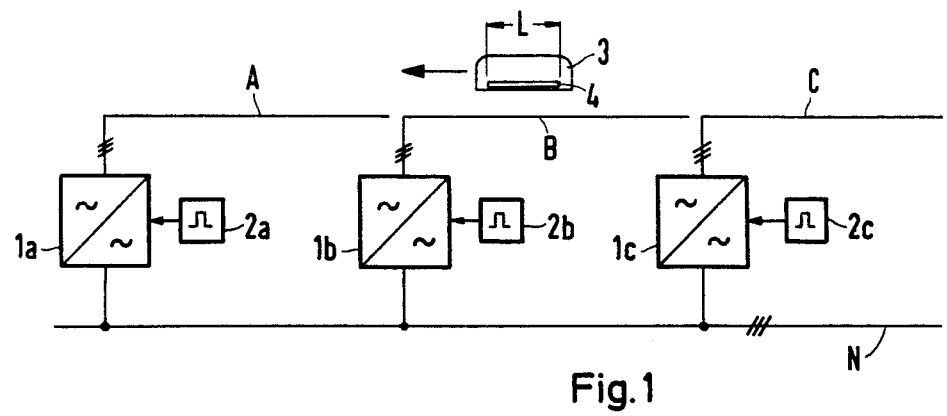
FIG. 1 is a schematic representation of a circuit arrangement comprising three switching sections for use with a track bound propulsion vehicle.

In FIG. 1 a section of a line is shown with a traveling field winding having individual switching sections A, B, C installed along the line. The traveling field winding is part of a synchronous linear motor that provides for the propulsion of a track bound traction vehicle 3 with an exciter 4 within. Due to the exceedingly great length of the traveling field winding, such a linear motor is also called a synchronous long stator motor. The traction vehicle 3 may be, for instance, a magnetic suspension vehicle. The exciter 4 of the synchronous linear motor is in the form of a dc carrying, preferably super conducting, exciter winding or in the form of a permanent magnet on the traction vehicle 3. The individual switching sections A, B, C of the traveling field winding are supplied from respective static frequency changers $1a$, $1b$, $1c$, which are designed as static frequency converters and are regulated by control devices $2a$, $2b$, $2c$. The converters $1a$, $1b$, $1c$ receive power from a supply network N.

Figure 2:
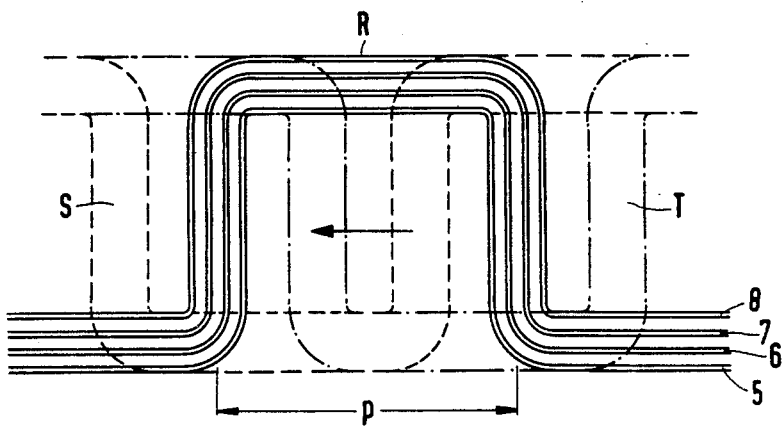
FIG. 2 is a schematic representation of the multiple rail conductor layout for three separate phases.

The switching sections shown schematically in FIG. 1 are generally of three phase design. Each switching section has a length in the order of kilometers, for instance, 5 km. The inductance of such a switching section is therefore relatively large causing a voltage drop across the traveling field winding which increases with the length of the switching section. In order to reduce the inductance and thereby the voltage drop across a switching section of the traveling field winding, the current carrying rails of the traveling field winding, are subdivided into several parallel connected individual conductors 5, 6, 7 and 8, according to FIG. 2. For the sake of clarity, only one phase R, with pole pitch P, is shown spread into individual conductors in FIG. 2. For phase S, a dashed outline and for phase T, a dot-dashed outline is drawn. The cross sections of the individual conductors are designed in accordance with the current load.

In a current carrying rail or a conductor strip, which is subdivided into several parallel connected individual conductors in accordance with the present invention, the inductance of a switching section is smaller than in known traveling field windings with single conductors of correspondingly larger cross sections, because of the reduced mutual coupling between the individual conductors. Since this reduces the operational reactance of longer switching sections, fewer frequency changers are needed. The maximum width of a conductor strip is about one third of the pole pitch P.

An additional advantage of the traveling field winding according to the present invention is the reduction of the harmonic content of the excitation flux interlinkage which is determined by the ratio of the travel length L of the exciter 4 to the pole pitch P. This harmonic content can be minimized after mathematical examination of the excitation flux interlinkage and proper selection of the spacings of the individual conductors extending at right angles to the travel direction of the phases of the traveling field winding.

Figure 3:
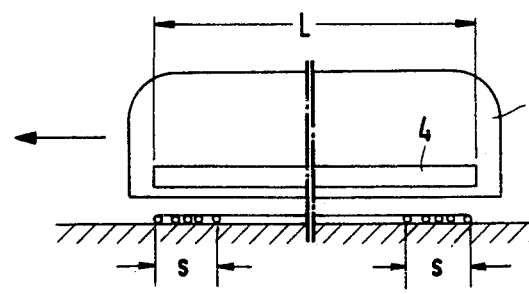
FIG. 3 is a longitudinal cross section of a traveling field winding with a suspension vehicle and exciter therein located above.

FIG. 3 shows a longitudinal cross section through a line with a traveling field winding and a suspension vehicle 3 with an exciter 4 located above it. The travel direction is indicated by an arrow. In the right half of FIG. 3, a current carrying rail consisting of five individual conductors is shown with smaller spacings between the inner individual conductors than those between the outer individual conductors. In the left half of FIG. 3, a traveling field winding with a current carrying rail divided up into five equally spaced individual conductors is shown.

Figure 4:
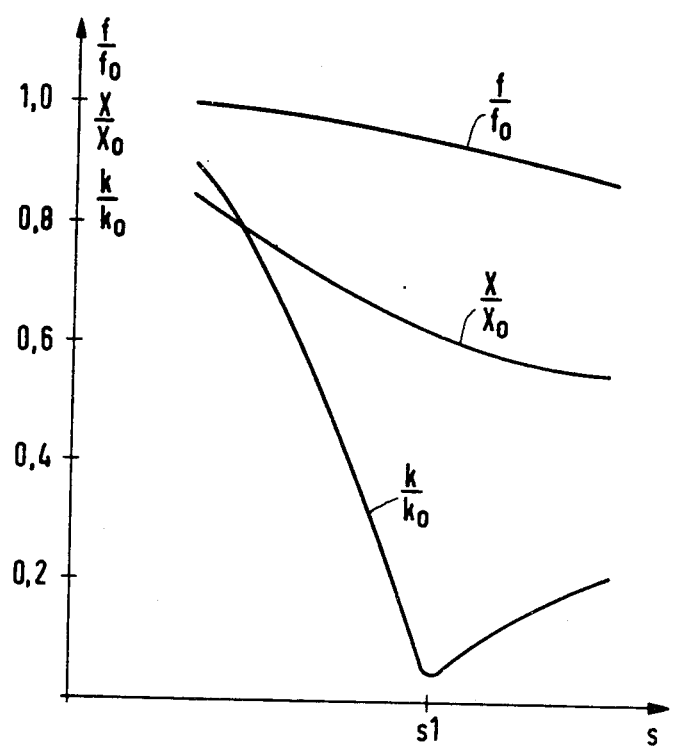
FIG. 4 is a diagram of the dependence of the thrust f, the operating reactance X, and the distortion k (each normalized to a maximum reference value) as a function of the conductor strip width s.

FIG. 4 shows a diagram, in which the thrust f, the operating reactance X and the harmonic content, i.e. distortion k, of a traveling field winding according to the present invention, referred respectively to the thrust $f_o$, the operating reactance $X_o$, and the distortion $k_o$ of a traveling field winding with a single solid conductor are shown as a function of the conductor strip width s. It is seen that with increasing width s of the conductor strip the thrust decreases slightly in the traveling field winding according to the present invention as compared to the thrust in a known traveling field winding, the phase windings of which comprise a solid current carrying rail. On the other hand, the operating reactance of a traveling field winding according to the present invention decreases greatly with increasing width of the conductor strip, as compared to the operating reactance in a known traveling field winding. The decrease of the operating reactance with increasing conductor strip width s considerably more than offsets the loss of thrust. The distortion of the traveling field winding according to the present invention has a minimum at a given width s1. FIG. 4 shows that the harmonic factor has a minimum for a width s1 of the conductor strip of a traveling field winding according to the present invention. If the width of the conductor strip is chosen, for instance, s1, then the operating reactance of a traveling field winding according to the present invention decreases as compared to the operating reactance of a known traveling field winding of equal conductor mass by about 40%. As a result, a decrease in the feed voltage by about 20% is obtained for the traveling field winding.

What is claimed is:

1. In an iron-free synchronous long stator linear motor, having an exciter disposed as a comoving translator on a track bound vehicle, and having a traveling field winding subdivided into switching sections which are supplied from a stationary, controlled static frequency changer, the improvement comprising the traveling field winding being a plurality of conductors disposed and connected electrically in parallel so as to reduce the operating reactance, said plurality of conductors having spacings with respect to each other which are uneven so as to minimize excitation flux interlinkage.

2. A method, of constructing the traveling field winding in an iron-free synchronous long stator linear motor having an exciter disposed as a co-moving translator on a track bound vehicle, and having a traveling field winding subdivided into switching sections which are supplied from a stationary, controlled static frequency changer, comprising constructing said traveling field winding as a plurality of conductors disposed and connected electrically in parallel so as to reduce the operating reactance and disposing said individual conductors with spacings to each other which are uneven so as to minimize the excitation flux interlinkage.

* * * * *